US007255000B2

(12) United States Patent
Pitkänen et al.

(10) Patent No.: US 7,255,000 B2
(45) Date of Patent: Aug. 14, 2007

(54) METHOD AND AN ARRANGEMENT FOR CONTROLLING POSITION AND/OR FORCE OF AN ELONGATED ROLLING DEVICE

(75) Inventors: Tatu Pitkänen, Järvenpää (FI); Petteri Lannes, Jokela (FI); Marko Tiilikainen, Kellokoski (FI)

(73) Assignee: Metso Paper, Inc., Helsinki (FI)

( * ) Notice: Subject to any disclaimer, the term of this patent is extended or adjusted under 35 U.S.C. 154(b) by 26 days.

(21) Appl. No.: 10/534,842

(22) PCT Filed: Nov. 13, 2003

(86) PCT No.: PCT/FI03/00860

§ 371 (c)(1),
(2), (4) Date: May 13, 2005

(87) PCT Pub. No.: WO2004/044316

PCT Pub. Date: May 27, 2004

(65) Prior Publication Data

US 2006/0086245 A1 Apr. 27, 2006

(30) Foreign Application Priority Data

Nov. 14, 2002 (FI) .................................. 20022030

(51) Int. Cl.
*G01L 5/04* (2006.01)
(52) U.S. Cl. ........................................................ 73/159
(58) Field of Classification Search ................... 73/159
See application file for complete search history.

(56) References Cited

U.S. PATENT DOCUMENTS 2,470,086 A * 5/1949 Adams ........................ 91/287
4,207,919 A 6/1980 Hutton (Continued)

FOREIGN PATENT DOCUMENTS

DE 37 36 696 A1 9/1988

(Continued)

OTHER PUBLICATIONS

"Digital Valve", web-page printout, URL http://www.digitalvalve.info/ printed May 12, 2005, 1 page.

(Continued)

*Primary Examiner*—Michael Cygan
*Assistant Examiner*—O. Davis
(74) *Attorney, Agent, or Firm*—Stiennon & Stiennon

(57) ABSTRACT

In paper and board machines the position of a rolling device relative to another rolling device and/or the force exerted by the rolling device on the other rolling device or any variable acting on these is measured, and the value of the measured variable is compared with the set value of said variable in order to obtain the difference value of the variable, and the position of the rolling device and/or the force it exerts on the other rolling device is controlled on the basis of the difference value. The fluid pressure of the hydraulic means (5) and/or the flow velocity of the fluid to the hydraulic means is changed in order to alter the difference value of the variable by opening and/or closing at least one digital valve in a digital valve pack (7) functionally connected to the hydraulic means (S).

29 Claims, 5 Drawing Sheets

U.S. PATENT DOCUMENTS

| | | | | |
|---|---|---|---|---|
| 4,480,537 | A | 11/1984 | Agronin et al. | |
| 4,597,275 | A | 7/1986 | Schneid et al. | |
| 4,729,153 | A * | 3/1988 | Pav et al. | 492/7 |
| 4,903,517 | A | 2/1990 | Van Haag et al. | |
| 5,029,521 | A * | 7/1991 | Pav et al. | 100/38 |
| 5,320,299 | A | 6/1994 | Fitzpatrick et al. | |
| 6,012,386 | A * | 1/2000 | Lahtinen et al. | 100/47 |
| 6,497,177 | B2 * | 12/2002 | Brendel et al. | 100/35 |
| 6,662,630 | B2 * | 12/2003 | Onnela et al. | 73/37.7 |

FOREIGN PATENT DOCUMENTS

| | | | |
|---|---|---|---|
| DE | 197 24 447 | A1 | 12/1998 |
| DE | 103 02 666 | A1 | 8/2003 |
| FI | 79875 | | 11/1989 |
| FI | 81632 | | 7/1990 |
| FI | 89525 | | 6/1993 |
| WO | WO 02/055787 | A1 | 7/2002 |
| WO | WO 2004/044316 | A1 | 5/2004 |

OTHER PUBLICATIONS

Search Report issued in Finnish App. No. 20022030.
International Search Report issued in PCT/FI03/00860.
International Preliminary Examination Report issued in PCT/FI03/00860.

* cited by examiner

METHOD AND AN ARRANGEMENT FOR CONTROLLING POSITION AND/OR FORCE OF AN ELONGATED ROLLING DEVICE

CROSS REFERENCES TO RELATED APPLICATIONS

This application is a U.S. national stage application of International App. No. PCT/FI2003/000860, filed Nov. 13, 2003, the disclosure of which is incorporated by reference herein. This application claims priority on Finnish App. No. 20022030, filed Nov. 14, 2002.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a method and an arrangement for controlling the position and/or force of an elongated rolling device in the roll nip between two elongated rolling devices in paper and board machines.

The nip pressure in a roll nip between two rolls and the opening and closing of the roll nip are adjusted with hydraulic means connected to said rolls, such as hydraulic cylinders. For nip pressure control, suitable measuring means are first used for measuring the force/pressure generated by the roll in the roll nip, the control logic of the control system converts an analog measurement signal into a digital signal and transmits a control signal in digital form to the control valve in charge of changing the nip pressure. The digital control signal is converted into analog form by the control valve, and then the control valve controls the fluid flow entering and leaving the hydraulic means. Such a manner of controlling nip pressure has noticeable shortcomings, of which the major ones relate to disappearing data content as an analog measurement signal is converted into digital form and a digital control signal is subsequently converted into a control signal.

There are frequently also problems caused by the fact that the same relatively large-sized control valve, such as a proportional valve, is used for controlling both the force exerted by the roll on the backing roll in the roll nip between the rolls and also the roll position relative to the backing roll. This problem is particularly tangible in reelers, because, as the fiber web is reeled around the reel core, the reel core needs to be continuously shifted away from the reeling cylinder. However, meanwhile it is necessary to maintain the nip pressure between the reel core and the reel cylinder on a determined level. The shift of the location of the reel core requires relatively large movements of the piston of the hydraulic means and also changes of the fluid pressure prevailing in the compression cylinder, whereas changes of the nip pressure can be achieved with considerably smaller piston movements and changes of the fluid pressure in the compression cylinder, entraining a tendency to cause control fluctuation and vibrations in the roll/rolls. In practice, due to the great mass of the control valve and the consequently slow changes of the flow volume in the hydraulic means, it is often difficult or even impossible to actively attenuate roll vibrations caused by control fluctuation by means of control engineering means.

Controlling hydraulic means by current control valves such as servo valves and proportional valves is awkward and inaccurate, because the required valves are bulky and slow, and thus have poor control resolution. In addition, the control valves themselves might cause control fluctuation and vibrations in the rolling devices by their own operation.

The purpose of the invention is to eliminate the prior art inconveniences. Thus, the first purpose of the invention is to achieve a system for controlling the location and the force of the roll, allowing the same hydraulic means to accurately control both the location of the roll relative to the backing roll in the roll nip and also the nip pressure (=force) generated by the roll in the roll nip, substantially without control fluctuation. A second purpose of the invention is to achieve an active manner of control enabling efficient attenuation of roll vibrations.

SUMMARY OF THE INVENTION

The invention relates to a method and to an arrangement for adjusting the location and/or force of an elongated rolling device in the roll nip between two elongated rolling devices.

The invention is based on the feature of controlling the nip pressure of a roll nip and the opening and closing of the roll nip with a hydraulic means, the volume flow arriving to the hydraulic means being at least partly controlled by a digital valve pack. The control signals utilized by the digital valve pack and transmitted by the control system are both in digital form, achieving the notable benefit over analog valves that control information does not require conversion from digital to analog form, so that no information will be lost while a digital control signal from the control system is converted into an analog control signal.

Use of the digital valve pack as switch means, allows very accurate control of the volume flow reaching the hydraulic means; thus, for instance, replacement of a large proportional valve with a digital valve pack containing 12 on/off digital valves provides a control resolution of 4096 different volume flows. What is more, on/off digital valves have markedly fast operation, so that the same digital valve pack allows control of the same hydraulic means both during shifts of the roll location, requiring large volume flow changes, while closing and opening of the roll nip, and also during changes of the nip pressure requiring relatively small volume flow changes.

In this patent application, at least one of the rolling devices in the roll nip between two elongated rolling devices is a roll used in paper and board machines, such as a calendaring roll or a reeler roll. The other of the rolling devices can then be a roll or an elongated roll-like array, such as a doctor blade, or the blade of a coating applicator used in fiber web coating, without being confined to these, however.

A digital valve stands for a valve having $N^{(NUMBER\ OF\ VALVES)}$ states; and between two successive states, the valve is driven directly from the first state to the second state.

The valve preferably has two states; it is either completely open or completely closed. When the valve is open, it is permeated by the entire volume flow rate of fluid allowed by this particular valve, and when the valve is closed, it is not permeated by fluid at all. In this application, a digital valve having two states is also referred to as an on/off valve and an on/off digital valve. A digital valve may have more than two states, and then the valve is driven stepwise from one state to another. The digital valve preferably has three positions; the valve transmits fluid flow into a first and a second direction, or then the valve does not transmit fluid. A digital valve pack including such digital valves having three states then has $N^3$ states, in which N is the number of valves in the digital valve pack.

In the method of the invention for adjusting the location and/or force of an elongated rolling device in the roll nip between two elongated rolling devices in paper and board machines, the location of the rolling device relative to the other rolling device and/or the force exerted by the rolling device on another rolling device or any variable acting on these are measured, and the measured variable value is compared with the set value of said variable to obtain the difference value of the variable. The difference value is used for adjusting the location of the rolling device relative to the other rolling device and/or the force exerted by the rolling device on the other rolling device. The fluid pressure of the hydraulic means and/or the flow velocity of the liquid to the hydraulic means is altered in order to change the difference value by opening and/or closing at least one digital valve in a digital valve pack functionally connected to the hydraulic means.

The arrangement, in turn, includes a measurement means for measuring the location of the rolling device and/or the force it exerts on the other rolling device, or any variable acting on these, and for transmitting a measurement signal to the control system. The arrangement further comprises a hydraulic means, by means of which the location of the rolling device is shifted relative to the other rolling device and/or the force exerted by the rolling device on the other rolling device in the roll nip is changed, a switch means for adjusting the volume flow of the hydraulic means, a control system for receiving a measurement signal and for comparing the information in the measurement signal with the set value of the variable in order to provide a control signal and to transmit it to the switch means. The switch means has receive means for receiving and processing a control signal and also at least one digital valve pack, which comprises digital valves, preferably on/off digital valves, which can be switched on and off on the basis of a control signal, so that the fluid pressure of the hydraulic means and/or the flow velocity of the liquid to the hydraulic means change.

In a preferred embodiment of the invention, the fluid pressure of the hydraulic means and/or the flow velocity of the fluid to the hydraulic means is changed on the basis of a digital control signal from the control system by means of the digital valve pack, without converting the control signal into analog form in the meantime. Then the measurement means generates an analog measurement signal, on the basis of which the control system transmits a digital control signal to the digital valve pack that changes the flow rate and/or the fluid pressure of the hydraulic means.

In the invention, the control signals received and used by the digital valve pack are digital and the control signals from the control system to the digital valve pack are already in digital from, so that the control signal does not require conversion from digital form into analog form, as would be the case if the liquid flow of the hydraulic means were adjusted with an analog control valve. This achieves the marked advantage over analog valves, that control information cannot be lost between the control system and the switch means (digital valve pack).

In another preferred embodiment of the invention, the location of the rolling device in the roll nip and the force it exerts on another rolling device in the roll nip are adjusted by the same hydraulic means and the amount and velocity of said volume flow of the hydraulic means are changed by means of one or more digital valve packs.

In a further preferred embodiment of the invention, the measurement means performs measuring of the amplitude and frequency of the roll vibration and the control system determines the counter vibration for this rolling device vibration (difference value), on the basis of which selected digital valves in the digital valve pack are opened and closed. The counter vibration should be such that the amplitude of the measured roll vibration decreases towards its set value.

In the last mentioned embodiment of the invention, a digital valve pack allows for active vibration attenuation of the roll in a roll nip, unlike analog control valves. Using digital valves, the volume flow of the hydraulic means can be rapidly and accurately increased and decreased with good volume flow resolution, so that even minor vibrations in the roll nip can be attenuated. This offers the further potential feature of using the digital valve pack alongside a conventional analog control valve, such as a proportional valve; the control valve serves to open/close a roll nip between the rolling device and possibly also to control the nip pressure between two rolling device in the roll nip. The vibration of the rolling device in the roll nip is attenuated with active control operations by using digital valves alongside the analog valves mentioned above for controlling the volume flow to and from the hydraulic means.

The invention is described below in further detail with reference to the accompanying figures.

DESCRIPTION OF THE PREFERRED EMBODIMENTS

The following examination starts with the main features of the designs and functions of the illustrated apparatuses and also the object to be illustrated by each figure.

Figure 1:
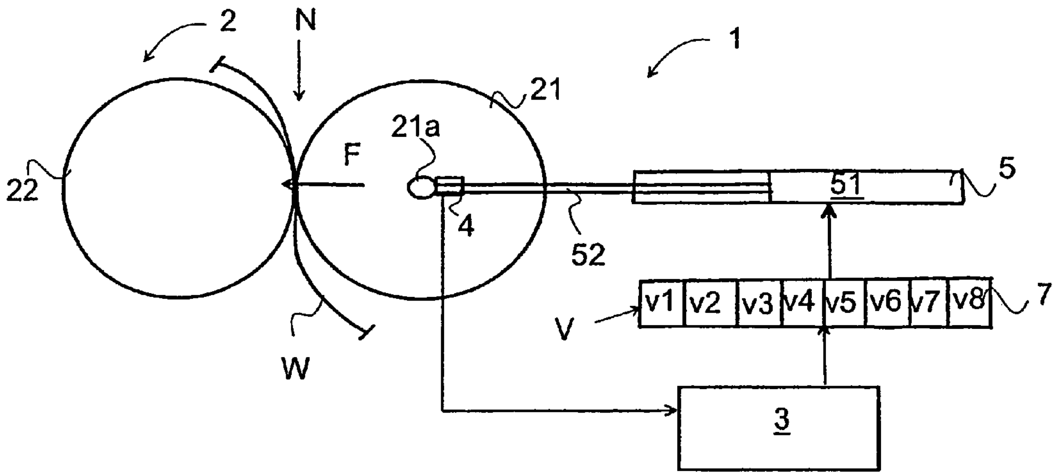
FIG. 1 shows a roll nip between two rolls viewed from the end of the roll pair, and also the arrangement used for controlling the nip pressure in the roll nip.

FIG. 1 shows a simple roll nip N between the rolls of a pair 2 of two rolls, the nip pressure being controlled with the control arrangement 1 of the invention. The control arrangement comprises a hydraulic actuator 5, a measurement means 4, a digital valve pack 7 and a control system 3.

Figure 2:
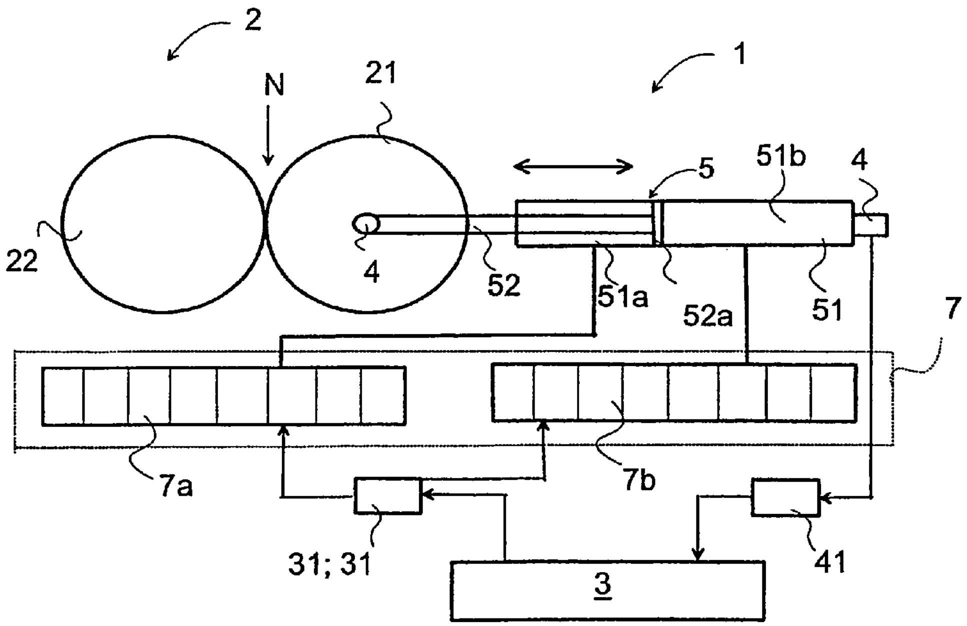
FIG. 2 also shows a roll nip between two rolls viewed from the end of the roll pair, and the arrangement used for controlling the opening and the closing of the roll nip.

FIG. 2 also shows a simple roll nip N between the rolls of a roll pair 2, the roll nip being opened and closed with the control arrangement 1 of the invention. The control arrangement includes a hydraulic actuator 5, the pressure of the hydraulic fluid prevailing on different sides of the cylinder relative to the piston head being controlled with two separate digital valve packs 7; *7a*, *7b*. The operation of the digital valve packs is controlled by the control system 3.

Figure 3A:
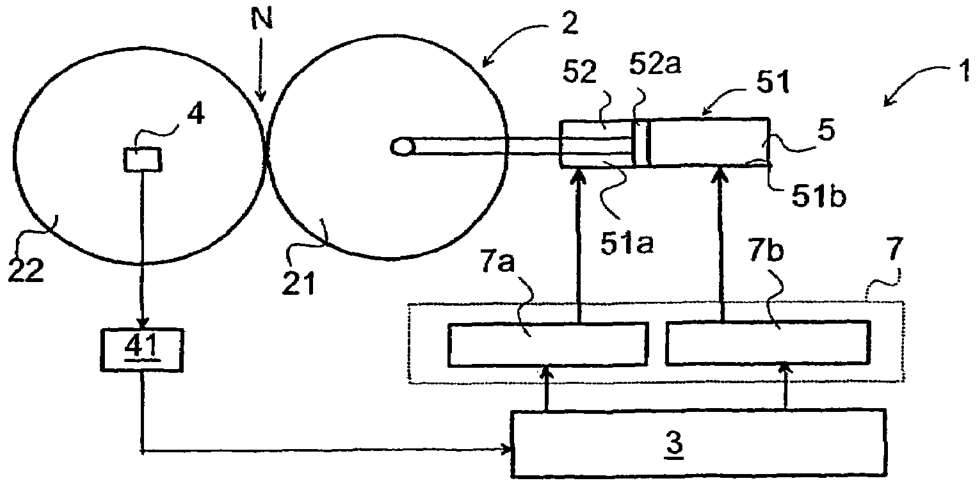
FIGS. 3A and 3E show a roll nip between two rolls viewed from the end of the roll pair. The figures illustrate the apparatus used for attenuating vibrations of the roll nip.

FIG. 3A shows a simple roll nip N between the rolls of a roll pair 2, whose vibrations are attenuated with the control arrangement 1, which includes a control system 3, two digital valve packs 7; *7a*, *7b*, and a hydraulic actuator 5, the pressure of the hydraulic fluid prevailing on different sides of the cylinder relative to the piston head being controlled with said digital valve packs.

Figure 3B:
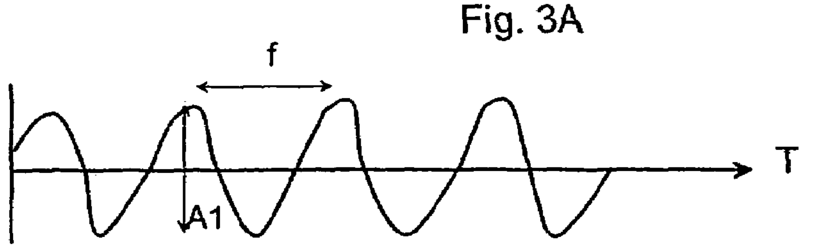
FIGS. 3B to 3D show the attenuation of vibrations generated in the apparatuses by using the arrangement of the invention.

FIG. 3B shows a vibration measured in the roll nip of the apparatus of FIG. 3A, the vibration having a given amplitude A1 and frequency f.

Figure 3C:
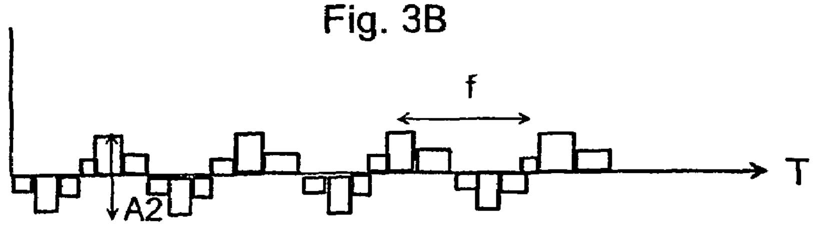

FIG. 3C shows a counter-vibration having a phase opposite to that of FIG. 3B and generated by opening and closing the valves in the digital valve pack, and having a frequency f and an amplitude A2.

Figure 3D:
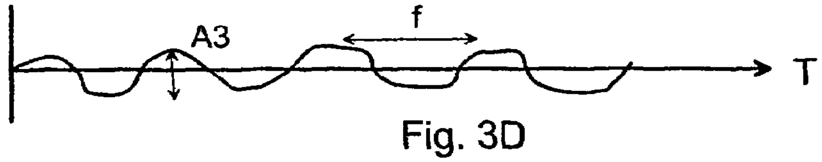

FIG. 3D shows an attenuated vibration in the roll nip, the vibration having a frequency f and an amplitude A3. The attenuated vibration is the sum vibration of the vibrations of FIGS. 3B and 3C.

Figure 3E:
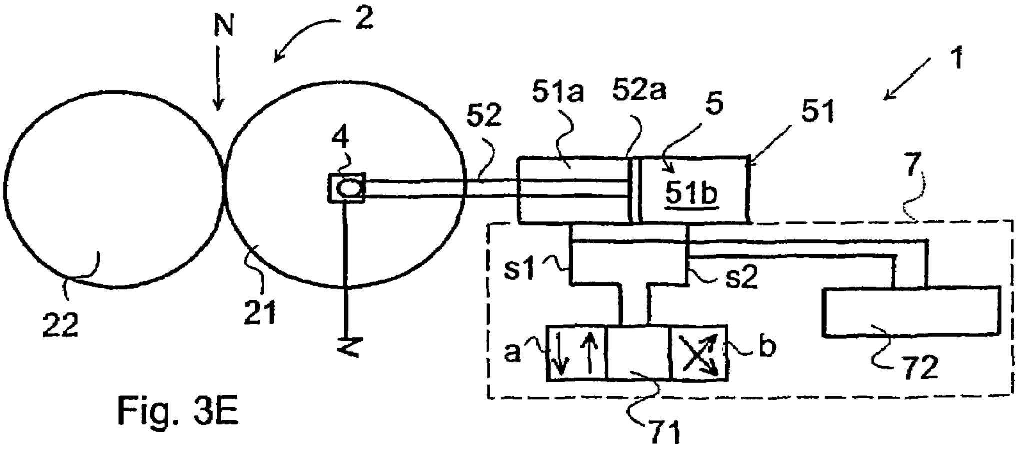

FIG. 3E illustrates a simple roll nip N between the rolls of a roll pair 2, whose vibrations are attenuated with the control arrangement, which includes a control system (not shown in the figure), a digital valve pack 7; 72 and a hydraulic actuator 5. The arrangement also comprises an analog valve 7; 71, which serves for controlling the nip pressure prevailing in the roll nip and also the opening and closing of the roll nip. This is hence a hybrid system, whose switch means 7 includes both an analog and a digital switch means.

Figure 4:
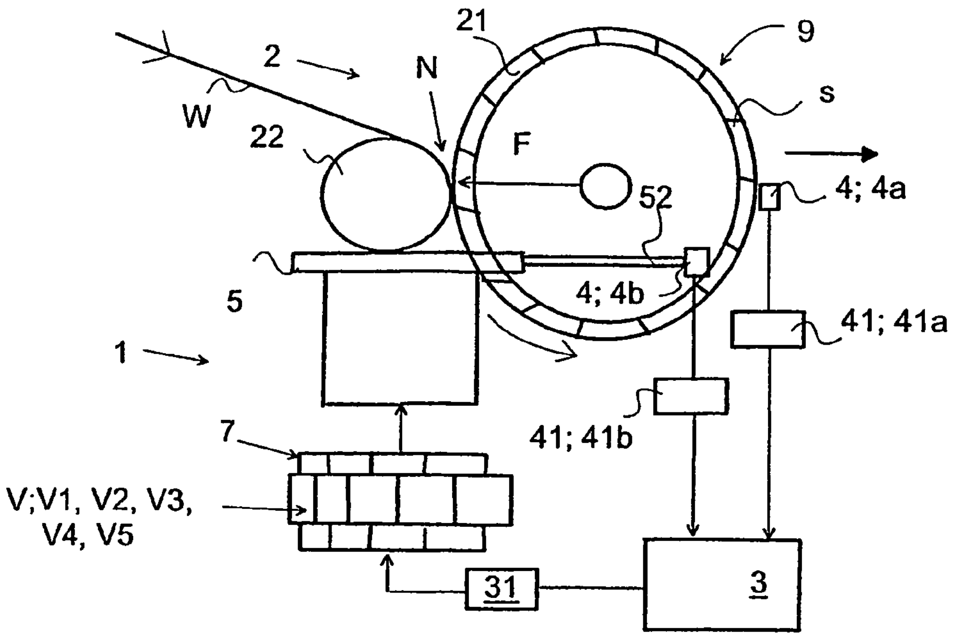
FIG. 4 is a schematic view of the roll nip between the reel cylinder of a reeler and the reel core, viewed from the end of the roll pair formed by the reel cylinder and reel core, and also the arrangement used for controlling the location of the reel core of the reeler and the nip force.

FIG. 4 illustrates the reel cylinder 22 and the reel core 21 of the reeler 9. The fiber web W is reeled around the reel core 21, and in this conjunction, the reel core needs to be displaced as the thickness s of the fiber web increases on the reel core 21. However, meanwhile, a given nip pressure needs to be maintained in the roll nip N in order to ensure regular reeling of the fiber web around the reel core. Both the location of the reel core relative to the reel cylinder and the nip pressure in the roll nip between the reel core and the reel cylinder are adjusted by the control arrangement 1, which includes a control system 3, a digital valve pack 7, measurement means 4 and a hydraulic means 5. The form of control signals 31 determine whether to change the location of the reel core with the digital valve pack relative to the reel cylinder, or the force F exerted by the reel core on the reel cylinder, i.e. the nip pressure prevailing in the roll nip. The same control arrangement 1 also enables attenuation of vibrations in the roll nip.

Figure 5A:
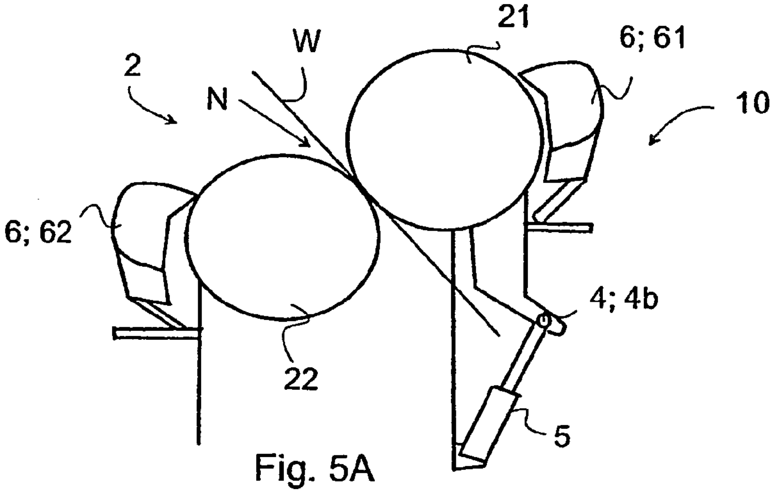
FIGS. 5A and 5B shows a roll nip viewed from the end of the pair of rolls in an apparatus used for fiber web coating, and the arrangement used for opening and closing the roll nip and for controlling the nip pressure.

FIG. 5A shows an apparatus 10 for coating a fiber web which is conventional per se, comprising a roll pair 2 of two rolls, spaced by the roll nip N. The fiber web W runs obliquely from the top downward and the coating agent is transferred from the rolls 2 onto the fiber web in the roll nip N. Inversely, the coating agent is transferred onto the surface of the rolls 2; 21, 22 at coating stations (application stations) 6.

Figure 5B:
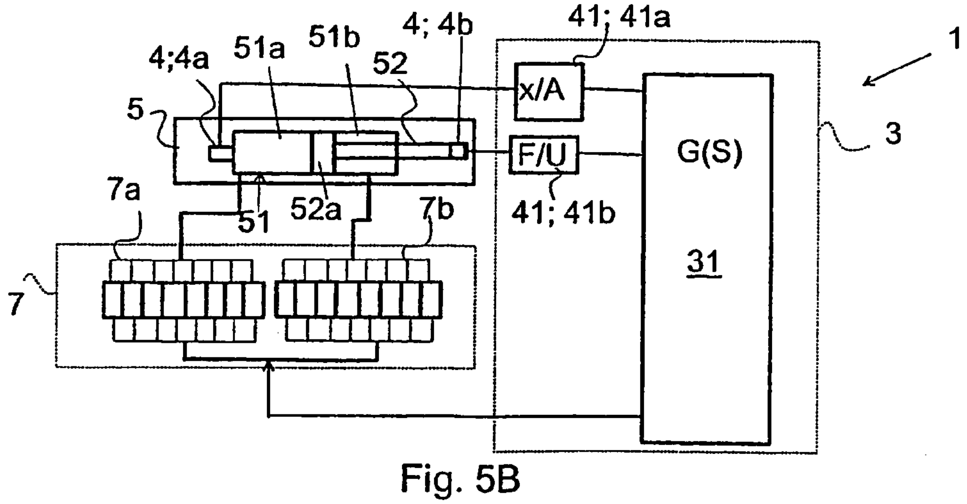

FIG. 5B illustrates an arrangement 1 for controlling the fiber web coating apparatus of FIG. 5A, comprising a control system 3, sensors 4, which measure the nip pressure (or the force exerted by the roll in the roll nip) and also the position of the roll in the roll nip. The control arrangement of the figure illustrates not only the application of the control system of the invention to a fiber web coating apparatus, but also the processing of measurement signals 41 from the sensors 4 by the control system 3 into control signals 31, which control the switch means 7, which is a digital valve pack.

Figure 6A:
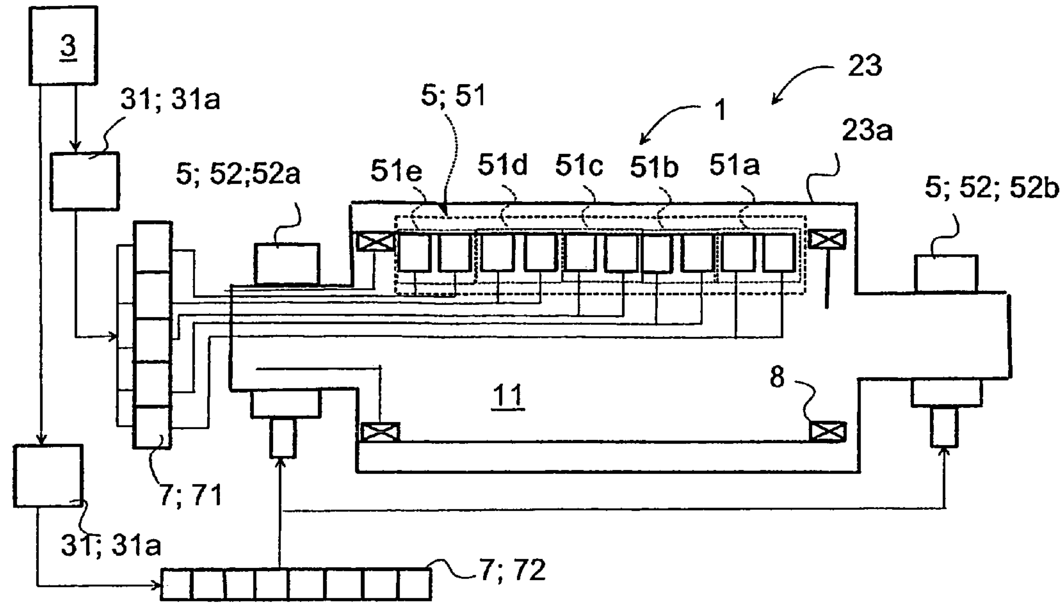
FIG. 6A is a schematic lateral view of a multi-zone roll and of the control arrangement used for pressurizing its different zones.

FIG. 6A illustrates a control arrangement 1 of the invention, in which pressurizing means 5; 51 within the mantle of a multi-zone roll 23 and pressurizing means 5; 52 outside the roll at the roll ends are controlled in accordance with the invention by digital valve packs 7; 71 and 7; 72 and also the control system 3.

Figure 6B:
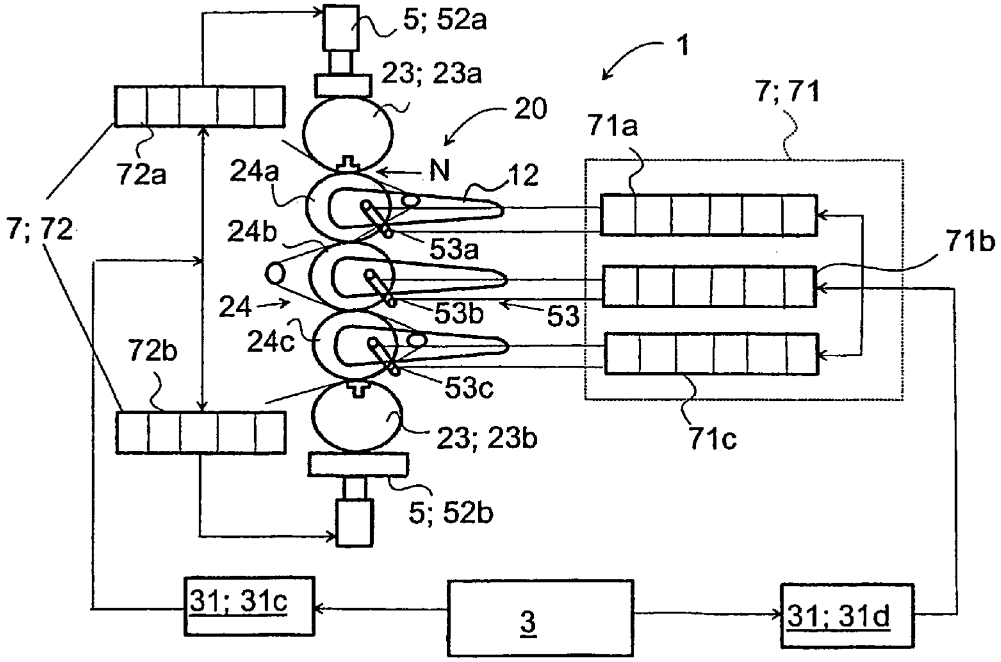
FIG. 6B shows an arrangement for controlling a multinip calender using the multi-zone roll of FIG. 6A as the lowermost and the uppermost roll.

FIG. 6B shows a multinip calender 20, which comprises three idle rolls 24 and a lower roll 23; 23*b* and an upper roll 23; 23A, of which the latter have design and operation of the pressurizing means inside and outside the rolls identical to those of FIG. 6A. The figure illustrates the implementation of the control arrangement 1 of the invention in multinip calendars 20. Hydraulic actuators 5 connected both to the idle rolls and to the lower and upper rolls are controlled by means of digital valve packs 7, which, in turn receive their control signals 31 from the control system 3.

Figure 7A:
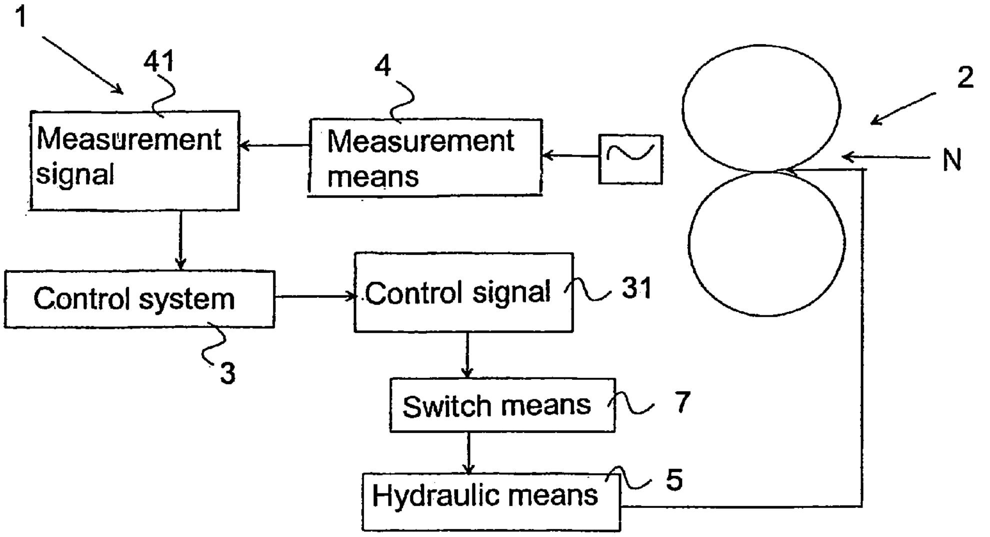
FIG. 7A is a block view of the arrangement of the invention and FIG. 7B is a block view of the method of the invention.

FIG. 7A shows the control arrangement 1 of the invention on a block diagram level. The arrangement serves for measuring and controlling the nip pressure of the roll nip N and/or the location of the rolls or any variables acting on these.

Figure 7B:
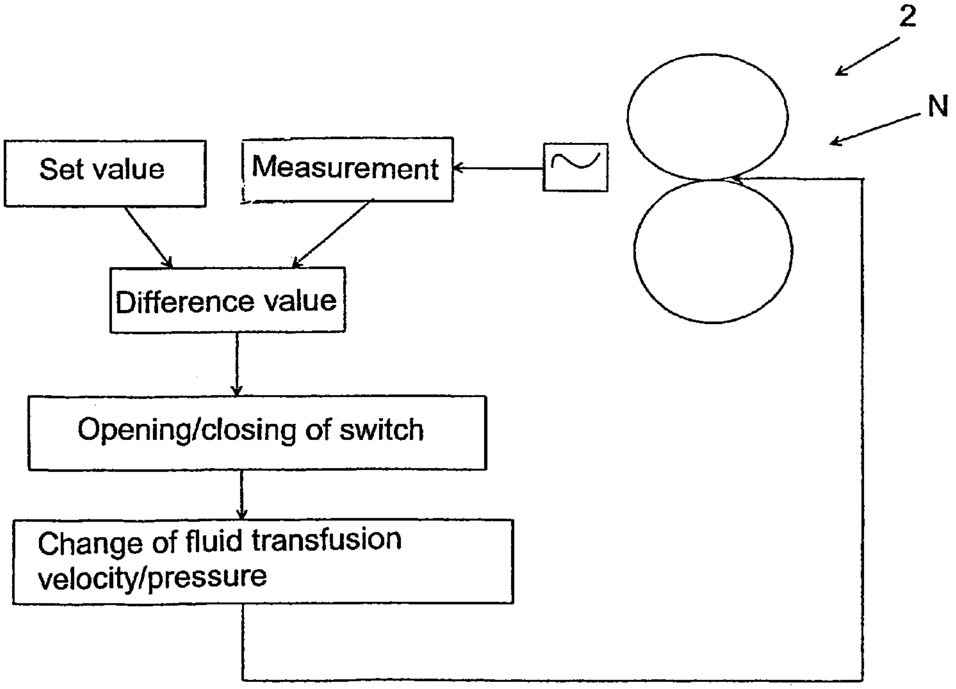

FIG. 7B, in turn, shows a method of the invention on a block diagram level. The method measures and controls by means of the difference variable the nip pressure of the roll nip N and/or the location of the rolls, or any variables acting on these.

The invention is described in greater detail below.

The control of the nip pressure in the roll nip N between a roll pair 2 of two rolls 21, 22 is illustrated in FIG. 1. The roll pair 2 may be located in a calender, for instance, where a fiber web W runs between the rolls, the fiber web being calendered (profiled) on its surface as it passes through the roll nip N. A hydraulic cylinder 5 is connected to the roll 21 over a lever arm 52 (piston). The pressure of the hydraulic fluid of the compression cylinder 51 of the hydraulic actuator 5 (hydraulic cylinder) is controlled by the digital valve pack 7. The pressure of the hydraulic fluid in the compression cylinder generates a specific force, by which the piston 52 acts on the roll 21. The roll 21 then exerts a force F on the stationary backing roll 22, generating a specific nip pressure in the roll nip N between the pair of rolls 2.

The pressure of the hydraulic fluid in the compression cylinder 51 is generated by opening one or more appropriate valves V; V1 to V8 of the digital valve pack 7. The digital valve pack comprises eight valves V1 to V8 of different sizes, the liquid flow passing through the valves being doubled each time it passes from a smaller digital valve to the next size. The difference between the volume flows of two digital valves with consecutive volume flow rates is thus 100%, in other words, the volume flow of a valve with greater volume flow is always double of that of a valve with smaller volume flow. The valve sizes are then e.g. valve V1 one l/min., valve V2 two l/min, valve V3 four l/min., etc. When it is desirable to generate e.g. a 10 kN nip pressure in the roll nip, the control system 3 opens valve V1 in the digital valve pack 7, so that hydraulic fluid flows into the compression cylinder 52 at a rate of 1l/min and the force F exerted by the roll 21 on the backing roll 22 increases.

Unless the force F or the nip pressure is desired, the valve V1 is closed and the valve V2 is opened, and the nip pressure and/or the force F are monitored anew. This way of opening and closing the valves V; V1 to V8 of the digital valve pack 7 aims at a valve combination that best realizes the desired nip pressure. The digital valve pack in FIG. 1 comprises 8 valves, so that there are $2^8$=number of potential different volume flows, i.e. the digital valve pack has a resolution of 256. When the principally adopted nip pressures are known, all the practically occurring nip pressures can be realized by appropriately staggered volume flow rates of the individual valves in a digital valve pack and by an appropriate number of valves. Having but two states, the valves included in a single digital valve pack have very rapid functions; each valve is either open or closed. With an open valve, the valve transmits the entire volume flow rate of hydraulic fluid allowed by the valve, and with a closed valve, it is permeated by a zero amount of volume flow. Thus each digital valve operates on the on/off principle known in digital technology. The digital valve pack receives digital control signals from the control system 3. The control system, in turn, receives the pressure/force data it needs from the force sensor 4, which is connected to the shaft 21*a* of the roll 21.

The arrangement 1 opening and closing the roll nip N in FIG. 2 uses two digital valve packs 7; 7*a*; 7*b*, which both comprise eight on/off valves. By means of the valves in the digital valve pack 7*a*, the pressure of the hydraulic fluid in the compression cylinder 5; 52 is increased in the cylinder portion 51*a* on the left-hand side of the piston head 52*a* of the piston 5; 51, and then the roll nip N opens. By contrast, by means of the valves in the digital valve pack 7*b*, the pressure of the hydraulic fluid is increased in the cylinder portion 51*b* on the right-hand side of the piston head, so that the roll nip closes. The rate of opening and closing the roll nip N, in turn, depends on the total volume flow rate of the opened valves. Opening different valve combinations achieves different opening rates of the roll nip, which depend on the cross-sectional area of the cylinder and on the fluid amounts flowing through the valves over a given period.

The roll nip is rapidly opened by opening all the valves in the digital valve pack 7; 7*b* simultaneously, and then no separate rapid opening valve will be necessary. Both the digital valve packs receive their digital control signals 31 from the control system 3. The control system, again, receives the positional data 41 about the roll that it needs from a sensor 4 measuring the roll location or position, the sensor being preferably located in the rear portion of the hydraulic actuator 5 with the hydraulic actuator viewed perpendicularly from the direction of the roll nip. The roll location can be measured either relatively to the backing roll or absolutely. Roll velocity data can also be included in the measurement data, and the velocity data can be measured by means of an acceleration sensor, for instance.

The arrangement of the invention also allows for attenuation of vibrations occurring in the roll nip in several devices used in paper and board machines, such as calenders, reelers, coating devices etc. FIGS. 3A-3E illustrate how to attenuate vibrations in a roll nip N between the rolls 21, 22 in a roll pair 2 by means of the arrangement 1 of the invention. Vibrations in the roll nip are often due to fluctuating control, hydraulic actuators, eccentric rolls, etc. The roll nip N of a calender is schematically shown in FIGS. 3A and 3E without a fiber web passing through the roll nip, calender frame structures, etc. The control arrangement 1 in FIG. 3A includes a sensor 4 for measuring vibrations exerted on the frame of the backing roll 22, a control system 3, two digital valve packs 7; 7*a*, 7*b*, and a hydraulic actuator (hydraulic cylinder) 5. Both the digital valve packs comprise eight on/off valves, so that both have a resolution covering 256 different states (volume flows). The valves in the digital valve packs 7 open and close liquid flows in compression cylinder portions 51; 51*a*, 51*b* located on different sides of the piston head 52; 52*a*, and then the digital valve packs can be used for increasing and decreasing the fluid pressure in the roll nip N. The opening and closing of the valves in the digital valve packs 7 are controlled by the control system 3, which receives vibration data 41 from the sensor 4.

FIG. 3B shows a vibration occurring in the roll nip of the apparatus of FIG. 3A, the vibration having been measured by the vibration sensor 4 of the arrangement 1 of FIG. 3A. This vibration has an amplitude A1 and a frequency f in the roll nip N. The vibration data 41 are transferred from the sensor 4 to the control system 3. The control system 3 determines a counter-vibration (difference value) for the vibration occurring in the roll nip 3, the phase of this vibration differing from that of the vibration in the roll nip. The counter-vibration is determined on the basis of the amplitude of the maximum permissible vibration (set value), for instance. After this, the control system controls appropriate valves in the digital valve packs 7 in FIG. 3B so that this particular counter-vibration realizes. The counter-vibration is illustrated in FIG. 3C and it has a frequency f and an amplitude A2. Then the sum vibration in the roll nip is the sum of the vibrations shown in FIGS. 3B and 3C, as shown in FIG. 3D. The amplitude of the sum vibration is A3 and its frequency is f. The amplitude A3 is smaller than the frequency A, implying attenuation of the vibration. This sum vibration can be remeasured by the sensor 4, and a suitable counter-vibration can be determined for it under the control procedure described above.

FIG. 3E, in turn, illustrates a control arrangement 1, in which the switch means 7 comprises a digital valve pack 72 and a conventional proportional valve 71. The nip pressure prevailing in the roll nip N is adjusted in a conventional manner per se by means of proportional valve 71, which controls the pressure of the hydraulic fluid prevailing in different portions 51*a* and 51*b* of the compression cylinder 5; 51 by the intermediation of fluid transfusion lines s1 and s2. The portion 51*a* of the compression cylinder is located on the left side of the piston head 52*a* of the piston 52 moving in the compression cylinder 51, and accordingly, the portion 51*b* of the compression cylinder is located on the right side of said piston head 52*a*. With the analog control valve 71 in position a, the hydraulic fluid flow follows the line s2 to the right side 51*b* of the cylinder 51, while hydraulic fluid is discharged from the left side 51*a* of the cylinder along line s1. This increases the nip pressure in the roll nip N. On the other hand, with the control valve 71 in position b, the hydraulic fluid flow decreases the nip pressure in the roll nip N, because the hydraulic fluid flow follows the line s1 to the portion 51*a* of the compression cylinder 51, to the left side of the piston head, and escapes along line s2 from the portion 51*b* of the compression cylinder on the right side of the piston head. Should the sensor 4 detect vibrations in the roll nip, they can be attenuated by means of the on/off valves in the digital valve pack 72 by opening and closing digital valves as shown in FIGS. 3B to 3D, by a counter-vibration in a phase opposite to that of the measured vibration. The vibrations to be attenuated may also originate from the operation of an analog control valve.

The control arrangement of FIG. 4 is used for positioning the reel core 21 of a reeler 9 relative to the reel cylinder 22 and also for controlling the nip pressure of the roll nip N of a roll pair 2 formed of a reel cylinder and a reel core.

Should a conventional control arrangement with a large-sized control valve be used for shifting the reel core 21 of the reeler relative to the reel cylinder 22 and for maintaining the nip pressure, the control would have a tendency to fluctuate: the change of volume flow of hydraulic fluid required for maintaining the nip pressure between the rolls 21, 22 is relatively small, whereas the change of volume flow of hydraulic fluid required for shifting the location of the reel core in said hydraulic means is relatively great. With the control switching from positioning of the mutual location of the rolls 21, 22 to control of the nip pressure prevailing in the roll nip between said rolls, or vice versa, the mass of a large-sized control valve is one reason of problems in passing from one control state to another, resulting in a tendency of fluctuating control. Fluctuating control, in turn, causes irregular reeling of the fiber web onto the reel core.

In accordance with the invention, the on/off digital valves V included in the digital pack are small-sized and have rapid operation. The control arrangement 1 illustrated in FIG. 4 comprises a digital valve pack 7, by means of which not only the position of the reel core 21 is adjusted relative to the stationary reel cylinder 22 but also the nip pressure of the roll nip N between the reel core 21 and the reel cylinder 22. The control arrangement 1 comprises a control system 3, which receives data indicating the location of the reel core 21 from the position sensor 4; 4*a* and also receives continually or intermittently from the force sensor 4; 4*b* measurement data 4 indicating the nip pressure in the roll nip N or the force exerted by the reel core 21 on the reel cylinder 22. The position sensor 4; 4*a* detects the thickness s of the fiber web layer W on the reel core 21, the sensor being usually located in the immediate vicinity of the outer surface of the fiber web W wound around the reel core.

Detection of the thickness of the fiber web layer can be performed either by a mechanical position sensor as in the figure, or on the basis of any characteristic of the fiber web. In mechanical detection, the position detector 4; 4*a* is moved in the direction of the arrow with a full head, the thickness s of the fiber web layer increasing as the position sensor sends the control system data about the position of the outer surface of the fiber web. In FIG. 4, the position sensor 4; 4*a* is placed on the side of the reel core, on top of the fiber web, and it is moved in the direction of the arrow with a full head as the thickness of the fiber web layer increases. However, the position sensor could as well be located at the end of the rear roll, and then the thickness of the fiber web layer would be measured by means of say, a photoelectric sensor. In some cases, the sensor may also measure a physical property of the fiber web, such as light transmission, for instance, which allows calculation of the thickness s of the fiber web layer on the reel core in the control system 3. The arrangement also includes a force sensor 4; 4*b* for measuring the force F exerted by the reel core 21 on the reel cylinder 22. The force sensor operates only when the roll nip N is closed. The force sensor can also be replaced with a pressure sensor, which measures directly the nip pressure prevailing in the roll nip N between the reel cylinder and the reel core.

The analog signals 41; 41*a*, 41*b* measuring the position and force are transferred from the force sensor 4; 4*b* and position sensor 4; 4*a* to the control system 3, where they are processed under the control function G(s) of the control system in order to control the pressure in the roll nip and the position of the reel core 21 and the reel cylinder 22 by means of the control signals 31 to be transmitted to the digital pack 7. The control signals 31 sent from the control system 3 are already in a digital form, so that they need not be converted into analog form, unlike control signals sent to analog valves. With the roll nip N closed, the pressure prevailing in the roll nip is adjusted on the basis of measurement results 41; 41*b* sent by the force sensor 4; 4*b* by opening and closing appropriate valves in the digital pack by means of control signals 31. When the thickness s of the fiber web W around the reel core has increased to such an extent that the reel core 21 needs to be displaced relative to the reel cylinder 22, appropriate on/off valves V; V1 to V5 in the control pack 7 are opened so that the volume flow of the fluid entering the hydraulic cylinder 5 is sufficient for generating a given hydraulic fluid pressure in the compression cylinder, which, in turn, generates the desired movement of the lever arm 5; 52 (piston) connected to the reel core 21. By altering the magnitude of the volume flow, the velocity of movement of the reel core can be controlled in the direction of the arrow with a full head. Even though the control mode were rapidly switched from control of the pressure in the roll nip N to control of the mutual position of the reel core 21 and the reel cylinder and vice versa, there would be no notable control fluctuation, because changes in the volume flow are controlled by rapidly operating on/off valves. In the arrangement 1 in FIG. 4, the digital valve pack 7 has five on/off digital valves V; V1 to V5, the control resolution of this particular digital valve pack comprising $2^5=32$ states, which is enough for most reelers. By increasing the number of valves contained in the digital pack, even high resolutions are rapidly achieved; e.g. 16 on/off valves already achieves a control resolution of $2^{16}=65536$ different states.

The control arrangement shown in FIG. 4 can also be connected with attenuation of vibrations generated in the roll nip. The amplitude and the frequency of the vibrations are measured with acceleration or force sensors, on the shaft of either of the rolls (21 or 22), for instance. The vibration signals are transferred to the control system 3, which controls the valves of the digital valve pack 7 under its control function G(s) to be switched open and off, so that the reel core 21 is made to vibrate in a phase opposite to an artificially detected vibration. The attenuation of the vibration is illustrated more in detail above in connection with FIG. 3.

FIGS. 5A and 5B illustrate the implementation of the arrangement of the invention at a coating station and the conversion of measurement signals from the sensors into control signals.

In FIG. 5A, the fiber web W passes through the roll nip N between the roll pair 2 formed of the roll 21 and the backing roll 22, the coating agent being transferred onto the surface of the fiber web in the roll nip from the surface of the roll and its backing roll. The coating agent is transferred onto the surface s of the rolls 21, 22 from the coating agent application stations 6; 61, 62, whose structure and operation are conventional per se. When it is desirable to open or close the roll nip N, the roll 21 is shifted relative to the backing roll 22 with a hydraulic cylinder 5 connected to a bearing housing of the roll 21 and simultaneously the force exerted by the roll on the backing roll is changed with the hydraulic cylinder while the roll nip N is closed. When the fluid pressure of the cylinder portion below the piston head moving in the cylinder is increased, the roll nip opens, or when the roll nip is closed, the nip pressure decreases, whereas, as the fluid pressure of the cylinder portion above the piston head moving in the hydraulic cylinder is increased, the roll nip is closed, and with the roll nip closed, the nip pressure increases. The position of the roll 21 relative to the backing roll 22 is measured with position sensors (shown more in detail in FIG. 5B) located at the lower end of hydraulic cylinders at each end of the roll 21 and detecting the position of the piston moving in the cylinder. The force exerted by the roll on the roll 21 in the nip N, in turn, is measured on the basis of the compression force between the piston and the bearing housing, by means of a force sensor 4; 4*b* connected to the upper end of the piston. FIG. 5A shows a force sensor 4; 4*b* functionally connected to a hydraulic cylinder 5 located at the first end of the roll pair, i.e. the end illustrated in the figure, a similar force sensor being provided at the other end of the roll pair 2.

FIG. 5B illustrates the processing of measurement signals 4; 41 arriving from the force sensor 4; 4*b* used in the apparatus of FIG. 5A and the position sensor 4; 4*a* and the control of the switch means 7 on the basis of measurement signals. The force sensor 4; 4*b* measures continuously the force exerted by the roll 21 on the backing roll 22 in the roll nip N and indicates the force level as an analog measurement signal 41; 41*b* by means of the voltage (U). The position sensor 4; 4*a*, in turn, measures continuously the position of the roll 21 relative to the backing roll 22 and indicates the position as an analog measurement signal 41; 41*a* by means of the current level (A). The measurement signals are transferred to a controller 3, which converts the measurement signals 41; 41*a*, 41*b* into digital control signals 31 under its control function G(s). The control signals 31 are transmitted as such to digital valve packs 7; 7*a*, 7*b*, which increase and decrease liquid flows in portions of the cylinder 51 located on different sides of the piston head 52; 52*a* by means of on/off digital valves on the basis of control signals 31. Digital valves of the digital valve pack 7; 7*a* serve to adjust the pressure of the hydraulic fluid in the cylinder portion 51*a* on the left side of the piston head 52*a* of the cylinder 51 and digital valves of the digital pack 7; 7*b* serve to adjust the fluid pressure of the cylinder portion 51*b* on the right hand of the piston head 52*a*.

The system may comprise a switch between the control system 3 and the digital valve packs 7, for selecting the control mode between position control and force control, however, no such switch is usually needed, unlike a conventional control arrangement using both control valves and analog connections, because the on/off valves contained in the digital valve pack have sufficiently rapid operation for switching the control mode from position control to force control and inversely, almost without any delay. The control arrangement of the invention has the additional marked advantage over an arrangement for controlling the roll position and the roll nip pressure using analog control valves that control signals 31 from the controller 3 need not be converted into analog control signals, yielding simpler control of the arrangement and reduced loss of information during signal conversions.

FIG. 6A, again, is a simplified view of a "multi-zone roll" 23 equipped with pressurizing means 5; 51 within the frame, and FIG. 6B shows the use of such a "multi-zone roll" in a multinip calender 20. The multi-zone roll has a stationary static frame 11 and hydraulic cylinders 5, 51 connected to the frame, which can be pressurized in couples each time. A mantle 23*a* rotates about the frame 11. Journaling 8 is provided between the mantle 23*a* and the frame 11. The pressurizing of the hydraulic cylinders is controlled by the digital valve pack 7; 71, which receives control signals 31; 31*a* from the control system 3. Hydraulic cylinders 5; 52 provided at the ends of the multi-zone roll serve to control the calender pressure by the intermediation of the digital valve pack 7; 72. The digital valve pack 7; 72 controlling the calender pressure is also connected to the control system 3, from which it receives the control signals 31; 31*b*.

Different parts of the mantle can be pressurized in different ways by means of hydraulic cylinders 5; 51 supported by the static roll frame 11. The hydraulic cylinders 5; 51 are pressurized in couples each time, so that the illustrated multi-zone roll has five zones 51; 51*a*, 51*b*, 51*c*, 51*d*, 51*e*, each of which is pressurized with an individual fluid transfusion duct. Each of said fluid transfusion ducts is connected to one of the on/off valves of the digital valve pack 7; 71, which are controlled by means of control signals 31*a* from the control system 3. By opening and closing appropriate valves of the digital valve pack 7; 71 the desired zones 51 under the mantle 23*a* of the multi-zone roll can be pressurized. At the ends of the multi-zone roll 23 shown in FIG. 6A, hydraulic cylinders 5; 52; 52*a*, 52*b* are provided, by means of which the multi-zone roll 23 can be raised and lowered. These hydraulic cylinders are controlled with a separate digital valve pack 7; 72, which receives control signals 31; 31*b* from the control system 3. The number of digital valves in the digital valve pack 7; 72 and the volume flow they transmit are selected so that the desired pressure levels of the hydraulic fluid are generated in the hydraulic cylinders 5; 52*a*, 52*b*, as explained above in connection with FIG. 1.

The operation of the hydraulic cylinders 5; 45 at the ends of the multi-zone rolls of the type shown in FIG. 6A and that of the pressurizing means 5; 51 within the multi-zone rolls is controlled in conventional control arrangements by means of analog control valves and switches. Such control arrangements are often susceptible to fluctuating control, because there are delays due to the operation of the control valves during the changes in the pressurization of different zones 51*a* to 51*e*. By contrast, in the control arrangement of the invention shown in FIG. 6A, the liquid flow from the hydraulic station (not shown in the figure) to the pressurizing means 51 is controlled with the digital valve pack 7; 71, which has 5 on/off valves. Each valve opens and closes a fluid transfusion duct leading to a given hydraulic cylinder pair 51; 51*a* to 51*e* under the roll mantle. The digital valves have rapid operation, so that the pressurization in the different roll zones can be quite rapidly changed, allowing crown variation control requirements caused by the weight of the roll to be rapidly met. The other digital valve pack 7; 72, in turn, serves to change the nip pressure of the roll nips and also to open and close roll nips by varying the fluid pressure of hydraulic cylinders 5; 52; 52*a*, 52*b* at the ends of the roll. The roll nips can also be opened/closed at the desired rate by opening/closing appropriate valves of the digital pack, as explained above in conjunction with FIG. 2. A conventional prior art control system for controlling the functions of a multinip calender comprises a microcomputer, which receives continuously information about the nip parameters from measurement sensors measuring these parameters and which transmits, on the basis of these data, control signals to hydraulic cylinders controlling the crown variation within the rolls and pressurizing the mantle and to hydraulic cylinders adjusting the nip pressure by means of analog valves and switches. Before the control signals are sent, they are converted from a digital form into an analog form with a view to controlling analog control valves. By contrast, in the control arrangement of the invention, control signals 31 in digital form coming from the control system 3 need not be converted into analog form, because the control valve(s) have been replaced with digital valve packs, whose control signals are digital.

Multi-zone rolls are often used as the uppermost or lowermost rolls and also as idle rolls in multinip calenders.

FIG. 6B illustrates an exemplified vertically directed multinip calender 20, in which multi-zone rolls of the kind shown in FIG. 6A have been used as the uppermost roll 23; 23*a* and the lowermost roll 23; 23*b* in the set of rolls. The multi-zone rolls 23; 23*a* and 23*b* comprise pressurization means within the rolls as shown in FIG. 6A and hydraulic cylinders 5; 52*a*, 52*b* have been connected to these rolls to be used for generating the desired nip pressure distribution and nip pressure in the multinip calender 20. In addition, these hydraulic cylinders serve to open and close calendering nips N in the set of rolls during a path interruption, for instance. There are no loading means within the rolls among the idle rolls 24; 24*a*, 24*b*, 24*c* between the uppermost roll 23; 23*a* and the lowermost roll 23; 23*b*, however, loading arms 12 have been connected to their bearing housings, and in turn, hydraulic cylinders 53; 53*a*, 53*b*, 53*c* have been connected to the loading arms for compensating the weight of the masses of the auxiliary means at the ends of these idle rolls, such as steam boxes and removal rolls (not shown in the figure). In addition to multinip calenders such as supercalenders, multi-zone calenders are generally used in presses for dewatering the fiber web.

The multinip calender 20 shown in FIG. 6B uses the control arrangement 1 of the invention for controlling the nip loads and nip load profiles of the roll nips N of a set of rolls. The control system 3 receives continuously information about the nip parameters from measurement sensors (not illustrated) measuring these parameters and controls the hydraulic cylinders 53; 53*a*, 53*b*, 53*c* compensating the weight of the auxiliary means on the basis of these data by sending control signals 31; 31*d* to the digital valve packs 7; 71. The number of on/off valves of the digital valve packs and the flow rate ratios have been selected such that the digital valve packs 7; 71*a*, 71*b*, 71*c* allow optimal compensation of the loads caused by the weight of the auxiliary means of the rolls 24; 24*a*, 24*b*, 24*c*. Each of the digital valve packs 71; 71*a*, 71*b*, 71*c* shown in FIG. 6B has five on/off valves, so that each of them is able to control $2^5=32$ different load compensating states. The control system 3 also controls the calendering pressure of the set of rolls and hydraulic cylinders 5; 52*a*, 52*b* functionally connected to the uppermost and the lowermost roll and controlling the opening and the closing of the roll nips by sending control signals 31; 31*c* to the digital valve pack 7; 72. The digital valve packs 7; 72; 72*a*, 72*b* controlling the calendering pressure and the opening and closing of the nips may be identical or different. Each of the digital valve packs 72 shown in FIG. 6B has five on/off valves, so that they can achieve $2^5=32$ different control states of calender loading and for the rate of opening/closing the roll nips N.

FIGS. 7A and 7B illustrate the control arrangement and method of the invention as a block diagram.

FIG. 7A is a block diagram of the control arrangement 1 of the invention for controlling the position and/or force of two elongated rolling devices in the roll nip N between two elongated rolling device pairs 2 in a paper machine. The rolling devices comprise a roll and its backing roll or a roll and a doctor blade, for instance. The control arrangement 1 comprises, as shown in FIG. 7A, a measuring means 4 for measuring the position and/or force of the rolling device or any variable acting on these and for sending a measurement signal 41 to the control system 3. The control arrangement 1 further comprises a hydraulic means 5, by means of which the position and/or force of the rolling device is changed in the roll nip, a switch means 7 for controlling the volume flow of the hydraulic means and a control system 3 for receiving a measurement signal 41 and for comparing the information contained in the measurement signal with the set value of the variable in order to generate a control signal 31 and to transmit it to the switch means 7. The switch means has receive means for receiving and processing a control signal and at least one digital valve pack having on/off valves, which can be opened and closed on the basis of a control signal in order to change the fluid pressure of the hydraulic means and/or the liquid flow rate to the hydraulic means.

In accordance with FIG. 7B the control method, in turn, serves to control the position and/or force of an elongated rolling device in the roll nip N between the rolling device pair 2 formed of two elongated rolling devices in paper machines. The position of the rolling device relative to the other rolling device and/or the force exerted by the rolling device on the other rolling device or any variable acting on these is measured. The measured variable value is compared with the set value of said variable in order to obtain the difference value of the variable. The difference value is used as a basis for adjusting the position of the rolling device and/or the force it exerts on the other rolling device with the aid of the hydraulic means. The fluid pressure of the hydraulic means and/or the liquid flow rate to the hydraulic means is changed in order to alter the difference value by opening and/or closing at least one on/off valve in the digital valve pack connected to the hydraulic means.

Only a number of embodiments of the method of the invention and of the related control arrangement has been described above, and it is obvious to those skilled in the art that the invention can be implemented also in other ways within the scope of the inventive idea defined in the claims.

Consequently, arrangements utilizing a digital valve pack can be applied for partly or completely compensating loads caused by nip pressures of vertically positioned multinip calendars, opening and closing velocities of the roll nip and auxiliary equipment of the idle means, which are of the type disclosed by DE patent specification 10101182.

With the use of the arrangement of the invention, the mass of rolls can also be controlled in an arrangement of the kind disclosed by DE patent application 10006299, in which the valve 32 shown in FIG. 2 of the patent application is replaced with a digital valve pack, which closes and opens rapidly flows from pumps 23 and 25, allowing the velocity of movement of the piston moving within the roll and the fluid amounts within the roll to be rapidly changed.

In the embodiment illustrated in FIGS. 5A to 5B above, the nip pressure of the roll nip and the opening and closing of the roll nip are adjusted in the apparatus used for fiber web coating by means of the control arrangement of the invention. The coating agent is transferred onto the fiber web in the roll nip between the roll and its backing roll from the surface of the roll and/or the backing roll or from endless belts rotating about the roll and/or its backing roll. The coating agent is transferred onto endless belts of the roll and/or its backing roll or rotating about the roll and/or its backing roll at application stations, which in several embodiments include an application means (=rolling device) pressed against the roll or the endless belt rotating about the roll, such as a blade or a rod. The load pressure between the application means and the roll or the endless roll rotating about the roll can be changed with a hydraulic actuator connected to the application means, such a hydraulic cylinder, in order to control the thickness and smoothness of the coating agent. The arrangement of the invention allows rapid and precise action on the load pressure between the application means and the roll or the endless belt rotating about the roll by conducting the hydraulic fluid flow passing to the hydraulic actuator through the digital valve pack, which has an appropriate number of on/off valves for achieving the desired load pressure level.

The load pressure between the doctor blade (=rolling device) and the roll surface can also be altered with the arrangement of the invention in doctor blades wiping the roll surface, which are commonly used in apparatuses for calendaring a fiber web, among other things, by conducting the hydraulic fluid flow pressing the doctor blade against the roll through the digital valve pack, which has an appropriate number of on/off valves for achieving the desired load pressure level.

The examples above describe the use of digital valves having two states. Digital valves may also have several states. Thus, a digital valve having say, three states could transmit oil into two directions, and in one position, it would not allow fluid to permeate at all. The operation of the valve can then be depicted as follows: State+1: the valve transmits oil into a first direction, to the front side of the piston in the cylinder, for instance.

State 0: the valve is closed and does not transmit fluid.

State−1: the valve transmits oil into a second direction, e.g. to the rear side of the piston in the cylinder, i.e. to the side of the piston rod.

Such a valve would operate in the way of an analog servo valve (the valve being closed in the center of the spindle), but would open to 100% or by digital steps each time. This allows the same valve to drive the nip into closed position with a full flow or to drive it into open position with a full flow, the opening/closing velocity of the roll nip depending on the size of the valves/valve combinations of the digital pack used in each case. The three-step valve digital valve mentioned above (having three states) is also preferably used in the vibration control of the roll nip, and then the digital valve can transmit oil into two directions.

The invention claimed is:

1. A method for controlling position or force in an apparatus which has a roll nip between a first elongated rolling device and a second elongated rolling device in a paper or a board machine, the method comprising the steps of:

- measuring a variable related to a position of the first elongated rolling device relative to the second elongated rolling device or the force exerted by the first elongated rolling device on the second elongated rolling device;
- comparing the value of the measured variable to a preset value of said variable in order to obtain a difference value of the variable;
- adjusting on the basis of the difference value of the variable, the position of the first elongated rolling device with respect to the second elongated rolling device or the force the first elongated rolling device exerts on the second elongated rolling device; and
- changing a fluid pressure of a hydraulic device or changing a rate of flow of a fluid to the hydraulic device in order to alter the difference value of the variable, by repeatedly driving with a digital signal a plurality of digital valves arranged in parallel to form a flow of fluid which is the sum of the flow from each of said plurality of digital valves, wherein each valve of the plurality has a finite number of discrete states, and wherein driving the plurality of digital valves comprises changing the plurality of digital valves from a first condition where all of the plurality of digital valves are in first particular discrete states directly to a second condition, different from the first condition, wherein at least one of the plurality of digital valves assumes a different discrete state, and wherein the hydraulic device is connected to the second elongated rolling device and changes the value of the measured variable.

2. The method of claim 1 wherein the digital valves of the plurality of digital valves have only two states, open and closed, and wherein the difference value is obtained digitally and defines a digital difference value and wherein the step of changing a fluid pressure of a hydraulic device or changing a rate of flow of a fluid to the hydraulic device comprises the step of, on the basis of the digital difference value, opening selected digital valves of the plurality of digital valves whose flow volume achieves a decrease of the difference value.

3. The method of claim 1 wherein the digital valves of the plurality of digital valves have only two states, open and closed, and wherein the step of measuring a variable comprises measuring the position of the first elongated rolling device in the roll nip relative to the second elongated rolling device; and wherein the step of changing a fluid pressure of a hydraulic device or changing a rate of flow of a fluid to the hydraulic device comprises the step of opening selected digital valves of the plurality of digital valves, whose flow volume achieves a decrease of the difference value at a selected rate.

4. The method of claim 1 wherein the digital valves of the plurality of digital valves have only two states, open and closed, and wherein the step of measuring a variable comprises measuring an amplitude and frequency of vibration in the nip formed between the first elongated rolling device and the second elongated rolling device, and further comprising:

- generating a control signal which is an inverse of the measured amplitude and frequency of vibration of the device;
- wherein the step of adjusting on the basis of the difference value is an adjustment based on the control signal;
- wherein the step of changing a fluid pressure of the hydraulic device or changing a rate of flow of a fluid to the hydraulic device comprises using the control signal to change the rate of flow of the fluid to the hydraulic device by opening and closing selected digital valves of the plurality of digital valves on the basis of the control signal in a phase opposite to the vibration so as to actively attenuate the vibration.

5. An arrangement for controlling position or force of an elongated rolling device in a roll nip between a first elongated rolling device and a second elongated rolling device, in a paper or board machine, the arrangement comprising:

- a measuring device arranged to measure at least one variable related to position or force of the first elongated rolling device to produce a measurement signal;
- a control system in measurement receiving relation to the measuring device, the control system arranged to compare the measurement signal with a selected set value of the variable to generate a control signal;
- a hydraulic device arranged to change the position or force of the rolling device in the roll nip with a fluid pressure or a flow rate of the fluid; and
- a switch connected in control signal receiving relation to the control system, the switch having at least one first plurality of digital valves connected in parallel so as to provide a sum volume flow of fluid which is the sum of the flow from each of said plurality of digital valves, wherein each valve of the plurality has only two or three discrete states wherein each discrete state of each valve is either open or closed and is switchable between said discrete states and wherein the hydraulic device is connected in sum flow volume receiving relation to at least one first plurality of digital valves so that the fluid pressure in the hydraulic device or the flow rate of the fluid to the hydraulic device can be changed by regulating the sum volume flow of fluid to the hydraulic device.

6. The arrangement of claim 5, wherein each valve of the plurality of digital valves is of a size different from the other valves of the plurality of digital valves, and wherein the size of each valve of the plurality of digital valves is selected to form a series of progressively larger digital valves starting with a first digital valve, and wherein each progressively larger valve has twice the flow capacity of the preceding valve in the series.

7. The arrangement of claim 6, wherein the measuring device is arranged to produce an analog measurement signal and wherein the control system includes an A/D converter having a digital output connected to the switch.

8. The arrangement of claim 7, wherein the digital output does not pass through a D/A converter.

9. The arrangement of claim 5, wherein the switch in addition to having the at least one first plurality of digital valves has an analog valve arranged in parallel with the first plurality of digital valves, arranged to supply the majority of the flow rate of the fluid to control the position of the first elongated rolling device or of the force the first elongated rolling device exerts on the second elongated rolling device in the roll nip.

10. The arrangement of claim 5, wherein the switch further comprises a second plurality of parallel connected digital valves connected to form a second volume sum flow of fluid which is the sum of the volume flow from each valve of said second plurality of digital valves, wherein each valve has only two discrete states, open and closed, and is switchable therebetween, and wherein the hydraulic device is connected in sum flow volume receiving relation to the second plurality of digital valves the hydraulic device being arranged to open and close the roll nip between the first elongated rolling device and the second elongated rolling device.

11. The arrangement of claim 10, wherein the hydraulic device is a hydraulic cylinder having a piston head having a first side and a second side, and a first cylinder portion located on the first side of the piston head is connected in sum flow volume receiving relation to at least one first plurality of digital valves, and a second cylinder portion located on the second side of the piston head is connected in sum flow volume receiving relation to the second plurality of digital valves.

12. The arrangement of claim 11, wherein the roll nip is arranged to be rapidly opened by opening all of the first plurality of digital valves.

13. The arrangement of claim 5, wherein the first elongated rolling device is a reel core, about which a fiber web is reeled, and wherein the second elongated rolling device is a reel cylinder, having a surface arranged to receive the fiber web and feed the fiber web into the roll nip which is located between the reel core and the reel cylinder;

wherein the hydraulic device is arranged to change the nip pressure in the roll nip by being functionally connected to the reel core, said hydraulic device additionally arranged to shift the position of the reel core relative to the reel cylinder; and wherein the measuring device is arranged to measure the force exerted by the reel core on the reel cylinder in the roll nip or is arranged to measure the position of the reel core relative to the reel cylinder.

14. The arrangement of claim 13, wherein:

the measuring device is arranged to detect amplitude and frequency of the reel core position which defines a vibration occurring in the reel core;

and wherein the control system is arranged to determine a counter-vibration and to generate a counter-vibration control signal; and wherein the switch is connected in control signal receiving relation to the control system and is arranged to control vibration by regulating the volume flow of fluid to the hydraulic device.

15. The arrangement of claim 5, wherein the first elongated rolling device and the second elongated rolling device are coating rolls, and are arranged to apply coating agent or coating paste onto one or both sides of a fiber web passing through the roll nip.

16. The arrangement of claim 15, further comprising an application means, with the aid of which the coating agent or coating paste is applied to a surface of a first coating roll or of an endless belt rotating about the coating rolls.

17. The arrangement of claim 5 wherein first elongated rolling device and the second elongated rolling device are rolls in a multi-nip calender and load reduction means are provided at least at the end of one said rolls;

wherein the hydraulic device is a hydraulic actuator provided at the end of one of said rolls;

and wherein the at least one first plurality of digital valves is arranged for controlling the hydraulic actuator so that the hydraulic actuator compensates for loads caused by auxiliary equipment on the one of said rolls.

18. The arrangement of claim 17, wherein an additional plurality of digital valves is connected in parallel to form an additional sum flow volume of fluid which is the sum of the volume flow from each valve of said additional plurality of digital valves, wherein each valve of the additional plurality of digital valves has only two discrete states: open and closed, and is switchable therebetween, and wherein the additional plurality of digital valves are connected in sum flow volume transmitting relation to control hydraulic actuators within the one of said rolls for pressurizing different zones of a roll mantle of the one of said rolls.

19. The arrangement of claim 17, wherein the hydraulic actuator provided at the end of the one of said rolls is arranged to open and close the roll nip.

20. The arrangement of claim 5, wherein the first and the second elongated rolling device are rolls having loading devices therewithin, and wherein said loading devices are arranged to be controlled with the at least one first plurality of digital valves.

21. The arrangement of claim 5, wherein the first elongated rolling device is a doctor blade and wherein the hydraulic device is a hydraulic actuator arranged to control the nip pressure of the roll nip between the doctor blade and the second elongated rolling devices.

22. The method of claim 1 wherein the step of driving the plurality of digital valves comprises driving at least 5 valves wherein each valve of the at least 5 valves has two discrete states: open and closed, and wherein the first condition and the second condition are selected from at least 32 possible different conditions the at least 5 valves can be in.

23. The method of claim 1 wherein the step of driving the plurality of digital valves comprises driving at least 8 valves wherein each valve of the at least 8 valves has two discrete states: open and closed, and wherein the first condition and the second condition are selected from at least 256 possible different conditions the at least 8 valves can be in.

24. The method of claim 1 wherein the step of driving the plurality of digital valves comprises driving at least 12 valves wherein each valve of the at least 12 valves has two discrete states: open and closed, and wherein the first condition and the second condition are selected from at least 4096 possible different conditions the at least 12 valves can be in.

25. The method of claim 1 wherein the step of driving the plurality of digital valves comprises driving at least 16 valves wherein each valve of the at least 16 valves has two discrete states: open and closed, and wherein the first condition and the second condition are selected from at least 65,536 possible different conditions the at least 16 valves can be in.

26. The arrangement of claim 5 wherein the at least one first plurality of digital valves comprises at least 5 valves wherein each valve of the at least 5 valves has two discrete states, open and closed, so that the at least one first plurality of digital valves have in combination at least 32 possible different conditions.

27. The arrangement of claim 5 wherein the at least one first plurality of digital valves comprises at least 8 valves wherein each valve of the at least 8 valves has two discrete states, open and closed, so that the at least one first plurality of digital valves have in combination at least 256 possible different conditions.

28. The arrangement of claim 5 wherein the at least one first plurality of digital valves comprises at least 12 valves wherein each valve of the at least 12 valves has two discrete states, open and closed, so that the at least one first plurality of digital valves have in combination at least 4,096 possible different conditions.

29. The arrangement of claim 5 wherein the at least one first plurality of digital valves comprises at least 16 valves wherein each valve of the at least 16 valves has two discrete states, open and closed, so that the at least one first plurality of digital valves have in combination at least 65,536 possible different conditions.

* * * * *

UNITED STATES PATENT AND TRADEMARK OFFICE

CERTIFICATE OF CORRECTION

PATENT NO. : 7,255,000 B2
APPLICATION NO. : 10/534842
DATED : August 14, 2007

INVENTOR(S) : Tatu Pitkänen et al.

It is certified that error appears in the above-identified patent and that said Letters Patent is hereby corrected as shown below:

In column 2, line 55 of the issued patent, “states; and between” should be --state; where N is the number of states possible for each valve, and when the digital valve is driven between--

In column 2, line 65, of the issued patent “another. The” should be --another. Alternatively the--

In column 3, line 2 of the issued patent, “N3 states” should be --$3^{(\text{NUMBER OF VALVES})}$ states--

In column 3, lines 2-3 of the issued patent, after “states” delete --, in which N is the number of valves in the digital valve pack--

Signed and Sealed this

Sixth Day of November, 2007

JON W. DUDAS
*Director of the United States Patent and Trademark Office*